S. A. THOMAS.
FRICTION CLUTCH.
APPLICATION FILED JUNE 22, 1915.
1,223,746.
Patented Apr. 24, 1917.
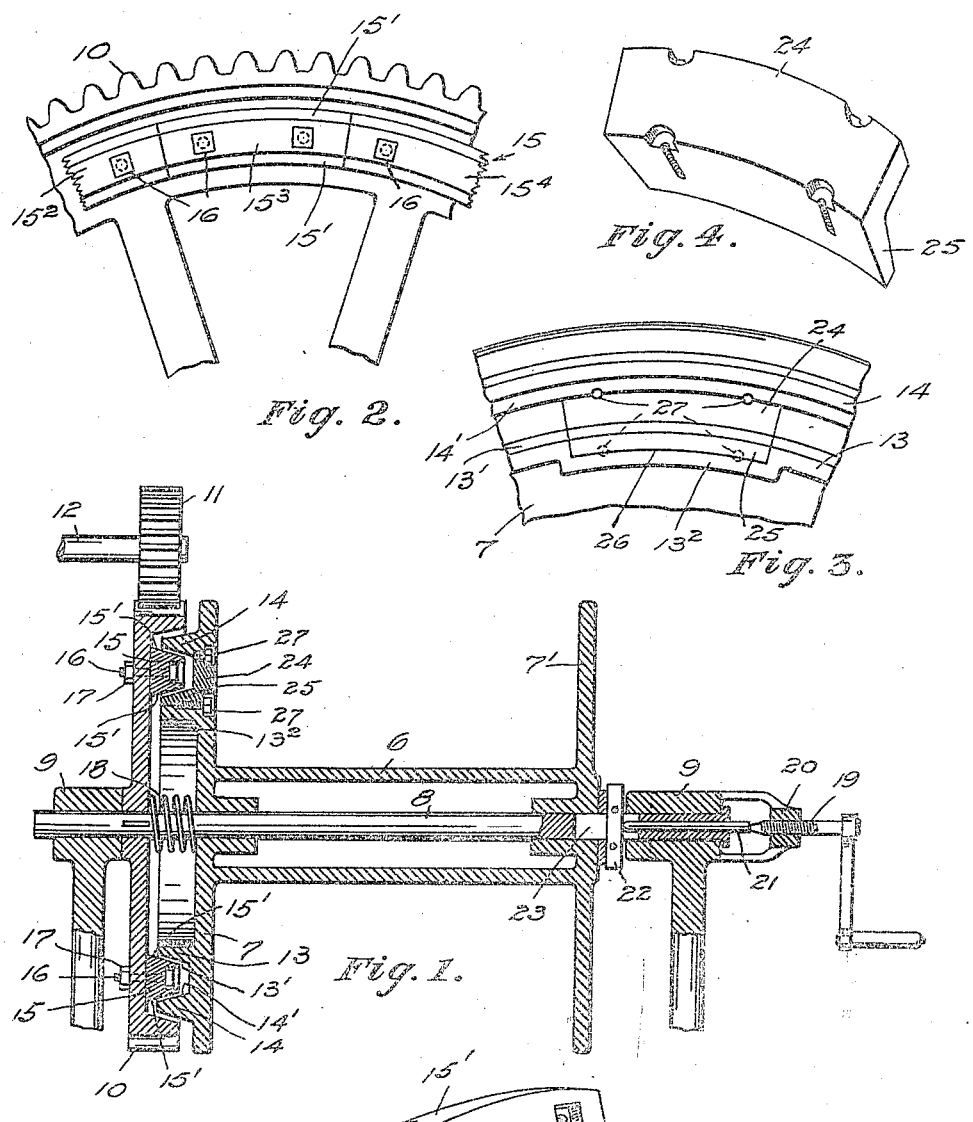

UNITED STATES PATENT OFFICE.

SAMUEL A. THOMAS, OF SEATTLE, WASHINGTON.

FRICTION-CLUTCH.

1,223,746.

Specification of Letters Patent.  Patented Apr. 24, 1917.

Application filed June 22, 1915. Serial No. 35,649.

*To all whom it may concern:*

Be it known that I, SAMUEL A. THOMAS, a citizen of the United States, residing at Seattle, in the county of King and State of Washington, have invented certain new and useful Improvements in Friction-Clutches, of which the following is a specification.

This invention relates to friction clutches and, more especially, to devices of this character which are utilized in coupling the winding drum to the complementary driving member of a hoisting engine or the like.

The object of my improvements is to provide inexpensively constructed means which are detachably connected to flanges of a rope winding drum and whereby the frictional block elements of a clutch member when they become worn or otherwise rendered inefficient may be quickly and conveniently replaced by others.

With these ends in view, the invention consists in the novel construction, adaptation and combination of parts as will be hereinafter described and claimed.

In the accompanying drawings, Figure 1 is a view in vertical section of a portion of a hoisting engine embodying my invention. Figs. 2 and 3 are fragmentary end views of the clutch members shown in Fig. 1. Fig. 4 is a perspective view of a removable portion of one of the clutch members; and Fig. 5 is a similar view of a clutch element or block shown detached.

In Fig. 1, illustrating a typical form of drum and driving means therefor of a hoisting engine, the reference numeral 6 designates the barrel, and 7 and 7¹, the end flanges of a drum rotatably mounted upon a shaft 8 which is journaled in bearing boxes 9 and 9¹ of the engine frame. Rigidly secured to said shaft and having its hub juxtaposed with the bearing box 9 is a spur gear wheel 10 which is rotated by a pinion 11 on a power driven shaft 12.

On the outer face of the drum flange 7 are two concentric ribs 13 and 14 having beveled opposing faces 13¹ and 14¹ which serve as frictional surfaces with respect to the correspondingly beveled outer faces 15¹ of an annular rib, or ring, 15 secured to the web 10¹ of said spur wheel. This ring is composed of a series of segmental friction blocks such as represented in Fig. 5 and indicated by 15², 15³ and 15⁴ in Fig. 2, the blocks being each detachably secured to the spur wheel web by headed bolts 16 and nuts 17 as shown in Fig. 1. To operatively couple the drum with the power driven spur wheel 10, the drum is moved axially in opposition to a spring 18 to carry the clutch elements 13 and 14 of the drum into engagement with the friction blocks on the spur wheel which, in the illustrated example, is accomplished by means of a screw 19 acting in a fixed nut 20 pushing a thrust pin 21 against a key 22 which is movable in a slot 23 of the drum carrying shaft.

The devices so far explained are, or may be, similar to devices hitherto in use.

According to the present invention the drum flange 7 has formed therein an opening of a size sufficient for the passage of one of the friction blocks. Provided for this opening is a removable closure (Fig. 4) comprising a plate 24 with an inwardly directed flange 25 which fits into a recess 26 provided in the drum rib 13 and constitutes, in effect, a part thereof. Below said opening the rib is reinforced, as at 13², to serve as a support for the plate flange 25. This plate is detachably held in place by means of screws 27 which engage in threaded holes arranged symmetrically with respect to the seams between the plate and the adjacent portions of the drum flange 7.

When the blocks 15², 15³, etc., which are of wood or other relatively soft material, become worn they have heretofore been removed after the shaft 8 has been withdrawn from its bearings so that the drum may be separated sufficiently far to enable the operator to get access to the various friction blocks—an extremely laborious operation and requiring considerable time to accomplish.

With my invention, however, the plate or closure for the drum flange may be readily removed and the various blocks thereupon removed through the opening in the drum flange when they are successively brought opposite such opening and subsequent to the withdrawal of the respective bolts 16.

As each block is removed it may be replaced by another and so on until a new series of blocks have been applied and secured by their bolts, after which the plate is restored to the drum flange to close the opening therein and have the plate flange 25 fill the recess in the drum flange. By such devices the strength of the drum flange is unimpaired and at the same time affords means whereby the friction blocks may be replaced with the expenditure of but little time and labor.

What I claim, is,—

1. In apparatus of the class described, the combination with a power driven member and a series of segmental friction blocks detachably secured thereto, of a driven member provided with an annular groove adapted to coöperate with said friction blocks, said member being provided with an opening therein of sufficient size for the withdrawal therethrough of one of said friction blocks, a closure for said opening, and means for detachably securing said closure within said opening.

2. In apparatus of the class described, the combination with a shaft, a power driven wheel mounted on the shaft, a series of friction blocks detachably secured to said wheel, a drum rotatable on said shaft and provided with a flange at its end adjacent to said wheel, and two concentric ribs provided on the drum flange and serving with the aforesaid friction blocks as clutch elements, said drum flange being provided with an opening which is coextensive with a recess provided in one of said ribs, of means for closing said opening and also the rib recess, and devices for detachably securing said means to the drum flange.

3. In apparatus of the class described, the combination of a driving member having detachable friction blocks thereon, a driven member provided with friction elements complementary to said blocks for coupling the two members, said driven member being provided with a detachable portion to furnish an opening whereby the friction blocks may be successively removed through said driven member.

4. In a device of the class described, the combination of a flanged drum having an annular friction groove in said flange, annular friction blocks secured to a revolving member and adapted to frictionally engage said friction groove, and a removable gate in the flange of said drum whereby the friction blocks may be changed when the gate is removed with the drum and revolving member in their assembled positions.

Signed at Seattle, Washington, this 11th day of June, 1915.

SAMUEL A. THOMAS.

Witnesses:
  PIERRE BARNES,
  LOLA G. WATSON.